United States Patent [19]

Motoyama et al.

[11] Patent Number: 5,030,699

[45] Date of Patent: Jul. 9, 1991

[54] LADDER SILICONE OLIGOMER COMPOSITION

[75] Inventors: Takahiko Motoyama, Tokyo; Yoshio Miyata, Chigasaki; Fumio Matsui; Yoichi Namba, both of Yokohama; Noritoshi Kamoi, Matsudo; Yukari Ohwaki, Kawasaki, all of Japan

[73] Assignee: Showa Denko K. K., Tokyo, Japan

[21] Appl. No.: 361,882

[22] Filed: Jun. 6, 1989

[30] Foreign Application Priority Data

Jun. 7, 1988 [JP] Japan .................................. 63-140069
Sep. 27, 1988 [JP] Japan .................................. 63-241230
Mar. 22, 1989 [JP] Japan .................................. 1-69998
Apr. 20, 1989 [JP] Japan .................................. 1-100958

[51] Int. Cl.$^5$ .......................................... C08F 283/00
[52] U.S. Cl. ...................................... 525/477; 528/33; 528/34; 524/391; 524/765; 524/385; 524/386; 524/376; 524/755; 524/762; 524/770; 524/284; 524/773; 524/356
[58] Field of Search ................ 525/477; 528/33, 34; 524/391, 765, 385, 386, 376, 755, 762, 356, 770, 284, 773

[56] References Cited

U.S. PATENT DOCUMENTS

| | | | |
|---|---|---|---|
| 3,457,323 | 7/1969 | Stengle | 260/826 |
| 4,510,283 | 4/1985 | Takeda et al. | 525/477 |
| 4,513,132 | 4/1985 | Shoji et al. | 528/33 |
| 4,801,507 | 1/1989 | Estes et al. | 428/450 |

OTHER PUBLICATIONS

Hackh's Chemical Dictionary, 4th ed., McGraw-Hill Book Co., 1969, p. 141.

*Primary Examiner*—Melvyn I. Marquis
*Attorney, Agent, or Firm*—Sughrue, Mion, Zinn, Macpeak & Seas

[57] ABSTRACT

Disclosed is a ladder silicone oligomer composition which comprises [A] 100 weight parts of a ladder silicone oligomer containing 1 to 10 weight % of hydroxyl groups and 1 to 10 weight % of ethoxy groups, [B] 1 to 200 weight parts of at least one silicon-containing compound selected from (a) silicone oligomers and polymers having a number average molecular weight of 500 to 100,000, which are obtained by reacting a compound of the following formula (I):

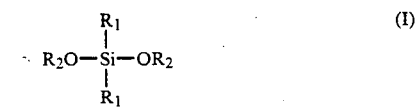

wherein $R_1$ is lower alkyl or phenyl, and $R_2$ is lower alkyl, with a compound of the following formula (II):

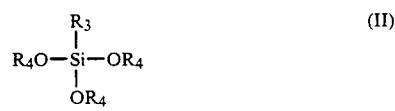

wherein $R_3$ is lower alkyl, or phenyl, and $R_4$ is lower alkyl, the molar ratio of the compound (I) to the compound (II) being from 1/0.3 to 1/9, and (b) ethyl silicates having a silica content of 28.8 to 45 weight % and hydrolysis products thereof, and [C] an organic solvent. The ladder silicone oligomer composition is useful as a coating material and an adhesive.

12 Claims, No Drawings

LADDER SILICONE OLIGOMER COMPOSITION

BACKGROUND OF THE INVENTION

1. Field of the Invention

The present invention relates to a ladder silicone oligomer composition.

The composition of the present invention has an excellent hygroscopic resistance, heat resistance, insulating property, crack resistance, adhesiveness, peel resistance, solvent resistance and water resistance, and is valuable as a coating material and adhesive for metals, ceramics, glass, plastics and electronic materials.

2. Description of the Related Art

A ladder silicone oligomer has an excellent in heat resistance, insulating property, hardness and water resistance, and therefore, this oligomer is used as a heat-resistant paint and an insulating coating for a semiconductor. However, the film made from the ladder silicone oligomer has a problem, in that cracks are readily formed, the film is brittle and the adhesiveness is poor. Accordingly, incorporation of various additives into the ladder silicone oligomer has been attempted. However, some of these additives have a poor compatibility with the ladder silicone oligomer, or other additives are volatilized when the temperature is elevated, for example, to 200 to 250°C C. None of presently available additives are found satisfactory.

A liquid prepared by hydrolyzing ethyl silicate provides a transparent coating film, but as is well-known, if the film thickness exceeds about 0.5 μm, cracks are readily formed. Accordingly, curable surface coating materials prepared by combining this liquid with various organic resins have been examined (see, for example, Japanese Unexamined Patent Publication (No.53-134033 and Japanese Unexamined Patent Publication No. 54-66936). From these compositions, thick coating films having a crack resistance can be produced, but heat resistance, weatherability and hardness are degraded.

SUMMARY OF THE INVENTION

Under this background, the primary object of the present invention is to provide a ladder silicone oligomer composition in which the defects of the conventional coating material composed mainly of a ladder silicone oligomer or ethyl silicate are overcome and which provides a coating having excellent adhesion, hygroscopic resistance, heat resistance, insulating property, water resistance, crack resistance and solvent resistance.

More specifically, in accordance with the present invention, there is provided a ladder silicone oligomer composition which comprises [A] 100 parts by weight of a ladder silicone oligomer containing 1 to 10% by weight of hydroxyl groups and 1 to 10% by weight of ethoxy groups, [B] 1 to 200 parts by weight of at least one silicone-containing compound selected from the group consisting of (a) silicone oligomers and polymers having a number average molecular weight of 500 to 100,000, which are obtained by reacting a compound represented by the following general formula (I):

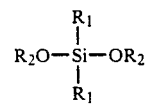

wherein $R_1$ stands for an alkyl group having 1 to 5 carbon atoms, or a phenyl group, and $R_2$ stands for an alkyl group having 1 to 5 carbon atoms.
with a compound represented by the following general formula (II):

wherein $R_3$ stands for an alkyl group having 1 to 5 carbon atoms, or a phenyl group, and $R_4$ stands for an alkyl group having 1 to 5 carbon atoms, the molar ratio of the compound (I) to the compound (II) being from 1/0.3 to 1/9, and (b) ethyl silicates having a silica content of 28.8 to 45% by weight and hydrolysis products thereof, and (C) an organic solvent.

DESCRIPTION OF THE PREFERRED EMBODIMENTS

The ladder silicone oligomer to be used as the component [A] in the present invention has a repeating unit structure having general formula (III):

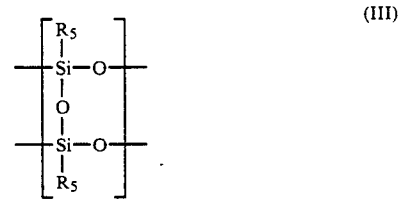

wherein $R_5$ stands for an alkyl group having 1 to 5 carbon atoms, a phenyl group, a hydroxyl group or a mixture thereof, the ladder silicone oligomer having terminal groups selected from the group consisting of an ethoxy group and a hydroxy group.

In the general formula (III) representing the ladder silicone oligomer, a lower alkyl group having 1 to 5 carbon atoms, such as a methyl, propyl or butyl group, is preferred as the alkyl group.

In the ladder silicone oligomer represented by the general formula (III), the content of ethoxy groups is 1 to 10% by weight and the content of hydroxyl groups inclusive of hydroxyl groups on the side chains and hydroxyl groups at the terminals is 1 to 10% by weight.

If the ethoxy group or hydroxyl group content in the ladder silicone oligomer is lower than 1% by weight, the ladder silicone oligomer composition comprising this ladder silicone oligomer and the silicone oligomer or polymer and/or ethyl silicate, which is coated on a substrate or bonded to a substrate, is difficult to cure to a desired extent even by elevating the temperature, and the resulting coating has a poor adhesiveness, water resistance, solvent resistance, hardness and heat resistance. If the ethoxy group or hydroxyl group content in the ladder silicone oligomer is higher than 10% by weight, the composition has a poor adhesiveness, water resistance and solvent resistance.

The number average molecular weight of the ladder silicone oligomer represented by the general formula (III) is preferably 300 to 50,000 and more preferably 500 to 10,000. This molecular weight can easily be determined by dissolving the ladder silicone oligomer in a solvent such as tetrahydrofuran and comparing the sample with a reference sample by the gel permeation chromatography. If the number average molecular weight of the ladder silicone oligomer is lower than 300, a part of the ladder silicone oligomer is decomposed and volatilized at the heating and curing step, and a satisfactory film cannot be produced or sufficient bonding is not obtained. If the molecular weight of the ladder silicone oligomer exceeds 50,000, the solubility in an organic solvent becomes poor and the compatibility with the silicone oligomer or polymer and/or ethyl silicate is degraded, and furthermore, cracks are often formed when a thick coating film is prepared.

The silicone oligomer or polymer to be used as the component [B] in the present invention is obtained by condensing a compound represented by the following general formula (I):

wherein $R_1$ stands for an alkyl group having 1 to 5 carbon atoms, or a phenyl group, and $R_2$ stands for an alkyl group having 1 to 5 carbon atoms,
with a compound represented by the following general formula (II):

wherein $R_3$ stands for an alkyl group having 1 to 5 carbon atoms, or a phenyl group, and $R_4$ stands for an alkyl group having 1 to 5 carbon atoms.
This silicone oligomer or polymer has a structure represented by the following general formula (IV):

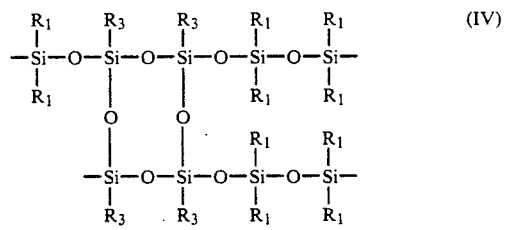

This silicone oligomer or polymer (herein after referred to as "silicone polymer") is soluble in an organic solvent, and since the silicone polymer has a structure resembling the structure of the ladder silicone oligomer represented by the general formula (III), the silicone polymer has a good miscibility with the ladder silicone oligomer, and thus the composition has an improved adhesiveness, crack resistance and peel strength.

The silicone polymer represented by the general formula (IV) is prepared as follows. The compound represented by the general formula (I) is mixed with the compound represented by the general formula (II) and the mixture is heated in water in the presence of an acid such as hydrochloric acid or an amine such as triethanolamine, whereby the compound of the formula (I) is condensed with the compound of the formula (II). The mixing ratio of the compound of the formula (I) to the compound of the formula (II) is in the range of 1/0.3 to 1/9.

The mixing ratio of the compound of the formula (II) is lower than 0.3, the compatibility of the prepared silicone polymer with the ladder silicone oligomer is degraded. If the mixing molar ratio of the compound of the formula (II) exceeds 9, a film made from the resulting ladder silicone oligomer composition is brittle, and has a poor crack resistance and adhesiveness.

The number average molecular weight of the silicone polymer is 500 to 100,000, preferably 600 to 50,000, and more preferably 700 to 10,000. If the number average molecular weight is lower than 500, the solvent resistance of the resultant composition is unsatisfactory, and if the number average molecular weight is higher than 100,000, the compatibility of the silicone polymer with the ladder silicone oligomer is unsatisfactory. The number average molecular weight can be determined according to the method described above with respect to the ladder silicone oligomer.

From the viewpoint of the compatibility between the ladder silicone oligomer and the silicone polymer, preferably $R_5$ of the latter silicone oligomer represented by the general formula (III) is the same as or analogous to $R_1$ and $R_3$ of the silicone polymer. For example, where $R_5$ of the ladder silicone oligomer of the general formula (III) is a methyl group, preferably both $R_1$ and $R_3$ of the silicone polymer of the general formula (IV) are methyl groups, and where $R_5$ of the ladder silicone oligomer of the general formula (III) is a phenyl group, preferably both $R_1$ and $R_3$ of the silicone polymer of the general formula (IV) are phenyl groups. Furthermore, where $R_5$ of the ladder silicone oligomer of the general formula (III) comprises methyl and phenyl groups at a molar ratio of 2/1, preferably the molar ratio of methyl and phenyl groups in $R_1$ and $R_3$ of the silicone polymer of the general formula (IV) is 2/1.

The ethyl silicate to be used as the component [B] has a silica content of 28.8 to 45% by weight, preferably 38 to 41% by weight. This ethyl silicate has a structure represented by the following formula (V):

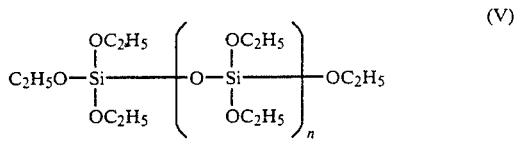

wherein n is 0 or a positive integer.

An ethyl silicate having a silica content higher than 45% by weight has a poor storage stability and compatibility with the ladder silicone oligomer or the silicone polymer, and where the resulting composition is made into a thick coating film, cracks are readily formed.

The ethyl silicate can be used as it is or after it has been hydrolyzed. The hydrolysis can be advanced by mixing the ethyl silicate with water in the presence of an acid or base. An ethyl silicate having a silica content of 40% by weight is industrially used and this ethyl silicate can be directly used in the present invention.

In this present invention, the silicone polymer and/or the ethyl silicate or the hydrolysis product thereof as the component [B] is incorporated in an amount of 1 to 200 parts by weight per 100 parts by weight of the ladder silicone oligomer as the component [A]. If the amount of the component [B] is smaller than 1% by weight based on the component [A], the coating made from the composition has a poor crack resistance and peel resistance. If the amount of the component [B] is larger than 200% by weight based on the component [A], the resulting film has a low hardness and the as-formed coating shows stickiness or sagging at the initial stage, and a good coating composition cannot be obtained.

The preferred mixing ratio between the ladder silicone oligomer as the component [A] and the component [B] differs according to the kind of the component [B] and the intended use of the resin composition. For example, where the silicone polymer is used as the component [B] and the obtained ladder silicone oligomer composition is used as a coating material, the component [A]/component [B] weight ratio is preferably from 100/1 to 100/50. Where the silicone polymer is used as the component [B] and the obtained composition is used as an adhesive, it is preferred that the component [A]/component [B] weight ratio in preferably from 100/20 to 100/200. Where the ethyl silicate is used as the component [B] and the obtained composition is used as a coating material, the component [A]/component [B] weight ratio is preferably from 100/5 to 100/100. Where the silicone polymer and ethyl silicate are used in combination as the component [B] and the obtained composition is used as a coating material, preferably, the component [A]/silicone polymer weight ratio is from 100/1 to 100/50 and the weight ratio of the sum of the component [A] and silicone polymer to the ethyl silicate is from 100/5 to 100/100.

The organic solvent to be used as the component [C] in the present invention can be selected from a variety of solvents, for example, alcohols, esters, ketones, aromatic hydrocarbons and cellosolves. An appropriate solvent is chosen according to the kind of the substrate and the application conditions. As specific examples of the organic solvent, there can be mentioned esters such as ethyl acetate and butyl acetate, ketones such as acetone and methyl ethyl ketone, aromatic hydrocarbons such as benzene and toluene, and Cellosolve (i.e., glycol ethyl ether), Cellosolve acetate (i.e., hydroxyethyl acetate) and butyl Cellosolve (i.e., glycol butyl ether)

The mixing ratio of the organic solvent differs according to the intended use of the ladder silicone oligomer composition. However, the organic solvent is incorporated in an amount such that the total concentration of the ladder silicone oligomer [A] and the component [B] in the ladder silicone composition is 5 to 70% by weight, preferably 10 to 60% by weight.

If desired, a pigment, a filler, a thickener, a leveling agent, a coupling agent, an ultraviolet absorber and a curing catalyst can be incorporated into the ladder silicone oligomer composition of the present invention.

The ladder silicone oligomer composition of the present invention is prepared by dissolving the ladder silicone oligomer as the component [A] and the silicone polymer and/or the ethyl silicate as the component [B] in the organic solvent as the component [C]. When the ethyl silicate or its hydrolysis product is used as the component [B], preferably the ethyl silicate or its hydrolysis product is added afterward.

The ladder silicone oligomer composition of the present invention prepared in the above-mentioned manner is valuably used as a coating material for substrates such as metals, ceramics, plastics and glass or as an adhesive for bonding two of these substrates.

When the composition of the present invention is applied as a coating material or adhesive to a plastic or glass substrate, preferably the substrate surface is treated with a silane coupling agent in advance. Any of spray coating, brush coating, dip coating, flow coating and spin coating methods can be adopted for applying the composition of the present invention to the substrate.

After the composition of the present invention has been applied as a coating material to a substrate, or after the composition of the present invention has been applied as an adhesive to two substrates and they have been bonded, the coated substrate or bonded body is allowed to stand at room temperature or a temperature lower than 100° C. to volatilize the organic solvent, and the resin is cured by heating at 160 to 250° C. for 10 to 120 minutes. Thus, a coating having excellent hardness, heat resistance, solvent resistance, peel strength, adhesiveness and crack resistance is obtained.

In the case of a plastic substrate or the like in which heating at a temperature as mentioned above is not permissible because of the low heat resistance, curing can be carried out at a relatively low temperature by using a curing agent such as an acid or base.

The present invention will now be described in detail with reference to the following examples and comparative examples.

When the ladder silicone oligomer composition was used as the coating material in the examples and comparative examples, the physical properties of the obtained films were determined according to the following methods.

(1) Crack resistance

A coated sheet was heated at 200° C. or 400° C. for 1 hour, and the sheet was then cooled to room temperature at a rate of 10° C./min. The surface of the coating was observed by a microscope at 100 magnifications. The sample in which cracks were not observed was indicated by mark "A", the sample in which slight cracks were observed was indicated by mark "B" and the sample in which many cracks were observed was indicated by mark "C".

(2) Water resistance

According to JIS-K-5400, a heat-cured coated sheet was immersed in water maintained at 30° C. for 24 hours, and the change of the coating was observed with the naked eye.

(3) Solvent resistance

A heat-cured coated sheet was immersed in acetone maintained at 30° C. for 24 hours, and dissolution or swelling of the coating was observed with the naked eye.

When the ladder silicone oligomer composition was used as the adhesive in the examples and comparative examples, the physical properties were determined according to the following methods.

(1) Tensile or shear bonding strength

Samples having dimensions specified in JIS K-6850 were bonded, and the bonding strength was measured according to the method of JIS K-6850.

(2) Peel strength

Samples having dimensions specified in JIS K-6854 were bonded, and the peel strength was measured according to the method of JIS K-6854.

(3) Heat resistance

A sample of a bonded body was allowed to stand at 200° C. for 30 minutes, and the shear bonding strength was measured at 200° C. according to the method of JIS K-6850.

(4) Water resistance and solvent resistance

A sample of a bonded body was immersed in water or toluene maintained at room temperature for 24 hours, and the shear bonding strength was measured according to the method of JIS K-6850.

EXAMPLE 1

A ladder silicone oligomer solution was prepared by dissolving 100 parts by weight of a ladder silicone oligomer of the above-mentioned general formula (III) H having a molecular weight of 2,200, in which $R_5$ was a methyl group, the hydroxyl group content was 4% by weight and the ethoxy group content was 4% by weight, in 200 parts by weight of a toluene/ethyl acetate mixed solvent (weight ratio=2/1).

A silicone polymer solution was prepared by dissolving 10 parts by weight of a silicone polymer having a molecular weight of 3,000, which was obtained by condensing a compound of the general formula (I), in which $R_1$ was a methyl group and $R_2$ was an ethyl group, with a compound of the general formula (II), in which $R_3$ was a methyl group and $R_4$ was an ethyl group, at a molar ratio of ½, into 20 parts by weight of a toluene/ethyl acetate mixed solvent (weight ratio=2/1).

A ladder silicone oligomer composition was prepared by mixing the ladder silicone oligomer solution with the silicone polymer solution. The compatibility between the two solutions was good. The composition was spray-coated on an acetone-degreased carbon steel sheet having a size of 7 cm × 15 cm so that the thickness of the dry coating was 5 microns. The coated steel sheet was allowed to stand at room temperature for 30 minutes and dried at 90° C. for 30 minutes, and curing was effected by heating at 180° C. for 30 minutes. Then, the coated sheet was cooled to room temperature and the physical properties were measured. The obtained results are shown in Table 1.

COMPARATIVE EXAMPLE 1

A ladder silicone oligomer solution was prepared by dissolving 100 parts by weight of a ladder silicone oligomer having the same structure as that of the ladder silicone oligomer used in Example 1 in 200 parts by weight of a toluene/ethyl acetate mixed solvent (weight ratio=2/1). In the same manner as described in Example 1, the solution was spray-coated on a carbon steel sheet so that the thickness of the dry coating was 5 microns. The coated steel sheet was allowed to stand at room temperature for 30 minutes and dried at 90° C. for 30 minutes, and curing was effected by heating at 180° C. for 30 minutes. Then, the coated steel sheet was cooled to room temperature and the physical properties were measured. The results are shown in Table 1.

As shown in Table 1, if the silicone polymer was not incorporated, the formed coating film had a crack resistance inferior to the coating film obtained in Example 1.

COMPARATIVE EXAMPLE 2

A ladder silicone oligomer solution having a ladder silicone oligomer concentration of 30% by weight was prepared by dissolving a ladder silicone oligomer of the general formula (III) having a molecular weight of 2,100, in which $R_5$ was a methyl group, the hydroxyl group content was 0.6% by weight and the ethoxy group content was 0.8% by weight, into a toluene/ethyl acetate mixed solvent (weight ratio=2/1). A composition was prepared by mixing 100 parts by weight of the obtained solution with the same silicone polymer solution as prepared in Example 1.

In the same manner as described in Example 1, the composition was coated in a dry coating thickness of 5 microns on a carbon steel sheet. After the drying, the coated steel sheet was heated at 180° C. for 30 minutes to effect curing. The physical properties were measured. The results are shown in Table 1. As is apparent from the results shown in Table 1, if the ladder silicone oligomer having too low hydroxyl and ethoxy group contents was used, the solvent resistance of the film was poor.

COMPARATIVE EXAMPLE 3

A ladder silicone oligomer solution having an oligomer concentration of 30% by weight was prepared by dissolving a ladder silicone oligomer of the general formula (III) having a molecular weight of 2,100, in which $R_5$ was methyl group, the hydroxyl group content was 15% by weight and the ethoxy group content was 15% by weight, in a toluene/ethyl acetate mixed solvent (weight ratio=2/1). A composition was prepared by mixing this solution with the same silicone polymer solution as prepared in Example 1. Then, coating and curing were carried out in the same manner as described in Example 1. The physical properties were as shown in Table 1. It was seen that if the hydroxyl group and ethoxy group contents were too high in the ladder silicone oligomer, the water resistance of the coating film was poor.

COMPARATIVE EXAMPLE 4

A silicone polymer was prepared by condensing a compound of the general formula (I), in which $R_1$ was a methyl group and $R_2$ was an ethyl group, with a compound of the general formula (II), in which $R_3$ was a methyl group and $R_4$ was an ethyl group, at a molar ratio of 1/10. This silicone polymer was dissolved in a toluene/ethyl acetate mixed solvent (weight ratio=2/1) to obtain a silicone polymer solution having a silicone polymer concentration of 30% by weight. The solution was mixed with the same ladder silicone oligomer solution as prepared in Example 1 at a weight ratio of 1/10 to prepare a composition. Coating and curing were carried out in the same manner as described in Example 1, and the physical properties were measured. The results are shown in Table 1.

As is apparent from the results shown in Table 1, if the silicone polymer prepared by using the compound of the general formula (II) at a molar ratio exceeding the range specified in the present invention was used, the crack resistance of the coating film was not improved.

COMPARATIVE EXAMPLE 5

A silicone polymer having a molecular weight of 380 was prepared by condensing a compound of the general formula (I), in which $R_1$ was a methyl group and $R_2$ was an ethyl group, with a compound of the general formula (II), in which $R_3$ was a methyl group and $R_4$ was an ethyl group, at a molar ratio of ½. A silicone polymer solution having a silicone polymer concentration of 30% by weight was prepared by dissolving this silicone polymer in a toluene/ethyl acetate mixed solvent (weight ratio=2/1). A composition was prepared by mixing this solution with the same ladder silicone oligomer solution as prepared in Example 1 at a weight ratio of 1/10. Coating and curing were carried out in the same manner as described in Example 1, and the physical properties were measured. The results are shown in Table 1.

As is apparent from the results shown in Table 1, if the silicone polymer having too low a molecular weight was used in combination with the ladder silicone oligomer, the improvement of the crack resistance in the coating film was insufficient, and the solvent resistance was poor.

TABLE 1

| | Results of Coating Film Test | | |
|---|---|---|---|
| | Crack resistance*1 | Water resistance | Solvent resistance |
| Example 1 | A | No change | No change |
| Comparative Example 1 | C | No change | No change |
| Comparative Example 2 | A | Slight swelling | Dissolution |
| Comparative Example 3 | B | Swelling and peeling | No change |
| Comparative Example 4 | C | No change | No change |
| Comparative Example 5 | B | No change | Swelling |

*1 observation was performed after heating at 400° C. for 1 hour and cooling.

COMPARATIVE EXAMPLE 6

A silicone polymer solution was prepared by dissolving 10 parts by weight of a silicone polymer having a molecular weight of 1,000, which was obtained by condensing a compound of the general formula (I), in which $R_1$ was a methyl group and $R_2$ was an ethyl group, with a compound of the general formula (II), in which $R_3$ was a methyl group and $R_4$ was an ethyl group, at a molar ratio of 1/0.2, into 20 parts by weight of a toluene/ethyl acetate mixed solvent (weight ratio=2/1). When this solution was added to the same ladder silicone oligomer solution as prepared in Example 1 and the mixture was stirred, it was found that the compatibility was unsatisfactory. When this mixture having an unsatisfactory compatibility was directly coated on a carbon steel sheet, coating unevenness was conspicuous and a complete coating film could not be formed.

COMPARATIVE EXAMPLE 7

A silicone polymer solution was prepared by dissolving 10 parts by weight of a silicone polymer having a molecular weight of 110,000, which was obtained by condensing a compound of the formula (I), in which $R_1$ was a methyl group and $R_2$ was an ethyl group, with a compound of the formula (II), in which $R_3$ was a methyl group and $R_4$ was an ethyl group, at a molar ratio of ½, into 20 parts by weight of a toluene/ethyl acetate mixed solvent (weight ratio=2/1). When this silicone polymer solution was added to the same ladder silicone oligomer solution as prepared in Example 1 and the mixture was stirred, it was found that the compatibility was unsatisfactory. When this mixture having an unsatisfactory compatibility was directly coated on a carbon steel sheet, coating unevenness was conspicuous and a complete coating film could not be formed.

EXAMPLE 2

A ladder silicone oligomer solution was prepared by dissolving 100 parts by weight of a ladder silicone oligomer of the general formula (III) having a molecular weight of 2,050, in which $R_5$ was a methyl group, the hydroxyl group content was 3% by weight and the ethoxy group content of 5% by weight, into 200 parts by weight of a toluene/hydroxyethyl acetate mixed solvent (weight ratio=3/1).

Separately, a silicone polymer solution was prepared by dissolving 10 parts by weight of a silicone polymer having a molecular weight of 2,700, which was obtained by condensing a compound of the general formula (I), in which $R_1$ was a methyl group and $R_2$ was an ethyl group, with a compound of the general formula (II), in which $R_3$ was a methyl group and $R_4$ was an ethyl group, at a molar ratio of ½, into 20 parts by weight of a toluene/hydroxyethyl acetate mixed solvent (weight ratio=3/1).

A composition was prepared by mixing the ladder silicone oligomer solution with the silicone polymer solution. The compatibility between the ladder silicone oligomer solution and the silicone polymer solution was good.

The composition was spin-coated on a silicon wafer at a rotation speed of 2,000 rpm. The coated wafer was dried at room temperature for 30 minutes and cured at 200° C. for 1 hour. A uniform coating having a thickness of 0.9 micron was obtained. When the coated wafer was heated at 400° C. and then cooled to room temperature at a rate of 10° C./min, cracks were not observed on the coated surface.

EXAMPLE 3

A ladder silicone oligomer solution was prepared by dissolving 100 parts by weight of a ladder silicone oligomer of the general formula (III) having a molecular weight of 1,800, in which $R_5$ was a phenyl group, the hydroxyl group content was 4% by weight and the ethoxy group content of 6% by weight, in 200 parts by weight of a toluene/acetone mixed solvent (weight ratio=4/1).

Separately, a silicone polymer solution was prepared by dissolving 15 parts by weight of a silicone polymer having a molecular weight of 2,100, which was obtained by condensing a compound of the general formula (I), in which $R_1$ was a phenyl group and $R_2$ was methyl group, with a compound of the general formula (II), in which $R_3$ was a phenyl group and $R_4$ was a methyl group, at a molar ratio of ½, into 30 parts by weight of a toluene/acetone mixed solvent (weight ratio=4/1).

A composition was prepared by mixing the ladder silicone oligomer solution with the silicone polymer solution. The compatibility between the ladder silicone oligomer solution and the silicone polymer solution was good. The composition was dip-coated on an aluminum sheet having a size of 5 cm×5 cm, and the coated aluminum sheet was dried at room temperature for 30 minutes and at 90° C. for 15 minutes. The coated aluminum sheet was heated at 200° C. for 1 hour to effect curing. The sheet was then cooled to room temperature and placed in a furnace maintained at 450° C. for 15 minutes, and the sheet was taken out from the furnace and placed in an atmosphere maintained at room temperature. When the coated aluminum sheet was observed under a microscope at 100 magnifications, cracks were not found on the coating film.

For comparison, coating was carried out by using the ladder silicone oligomer solution in which the silicone polymer solution was not incorporated. When the coated sheet was heated at 450° C. and cooled to room temperature, it was found that fine cracks were formed on the coating film.

EXAMPLE 4

A ladder silicone oligomer solution was prepared by dissolving 100 parts by weight of a ladder silicone oligomer of the general formula (III) having a molecular weight of 2,200, in which $R_5$ comprised a methyl group and a phenyl group at a molar ratio of 2/1, the hydroxyl group content was 3% by weight and the ethoxy group content was 5% by weight, in 200 parts by weight of a toluene/butyl acetate mixed solvent (weight ratio=4/1).

Separately, a silicone polymer solution was prepared by dissolving 10 parts by weight of a silicone polymer having a molecular weight of 1,500, which was obtained by condensing a compound of the general formula (I), in which $R_1$ comprised a methyl group and a phenyl group at a molar ratio of 2/1) and $R_2$ comprised a methyl group and a phenyl group at a molar ratio of 2/1, with a compound of the general formula (II), in which $R_3$ comprised a methyl group at a molar ratio of 2/1 and $R_4$ comprised a methyl group and a phenyl group at a molar ratio of 2/1, at a molar ratio of 1/5, into 20 parts by weight of a toluene/butyl acetate mixed solvent (weight ratio=4/1).

A composition was prepared by mixing the ladder silicone oligomer solution with the silicone polymer solution. The compatibility between the ladder silicone oligomer solution and the silicone polymer solution was good. The composition was coated on a polyphenylene sulfide sheet having a size of 5 cm×5 cm, which had been treated with a silane coupling agent, and the coated sheet was dried at room temperature for 30 minutes and at 90° C. for 15 minutes. The coated sheet was heated at 180° C. for 30 minutes to effect curing. The sheet was then cooled to room temperature and heated at 200° C., and then, the sheet was rapidly cooled to room temperature. When the sheet was observed under a microscope at 100 magnifications, it was found that cracks were not formed on the coating film.

For comparison, coating was carried by using the ladder silicone oligomer solution in which the silicone polymer solution was not incorporated. When the coated sheet was heated at 200° C. and rapidly cooled to room temperature, it was found that fine cracks were formed on the coating film.

EXAMPLE 5

A ladder silicone oligomer solution was prepared by dissolving 100 parts by weight of a ladder silicone oligomer of the general formula (III) having a molecular weight of 2,200, in which $R_5$ was a methyl group, the hydroxyl group content was 4% by weight and the ethoxy group content was 4% by weight, in 200 parts by weight of a toluene/ethyl acetate mixed solvent (weight ratio=2/1).

Separately, a silicone polymer solution was prepared by dissolving 50 parts by weight of a silicone polymer having a molecular weight of 3,000, which was obtained by condensing a compound of the general formula (I), in which $R_1$ was a methyl group and $R_2$ was an ethyl group, with a compound of the general formula (II), in which $R_3$ was methyl group and $R_4$ was an ethyl group, at a molar ratio of ½, into 20 parts by weight of a toluene/ethyl acetate mixed solvent (weight ratio=2/1).

A composition was prepared by mixing the ladder silicone oligomer solution with the silicone polymer solution. The compatibility between the ladder silicone oligomer solution and the silicone polymer solution was good. Acetone-degreased carbon steel sheets having dimensions specified in JIS K-6850 were bonded together by using the above composition. The bonded body was dried at room temperature for 20 hours and at 90° C. for 30 minutes, and the bonded body was heated at 180° C. for 30 minutes to effect curing. Then, the bonded body was cooled to room temperature and the physical properties were measured. Then, according to JIS K-6854, a T-shaped peel test pieces were prepared and they were bonded under the same conditions as described above, and the peel strength was measured. The results are shown in Table 2.

COMPARATIVE EXAMPLE 8

A ladder silicone oligomer solution was prepared by dissolving 100 parts by weight of a ladder silicone oligomer having the same structure as that of the ladder silicone oligomer used in Example 1 in 50 parts by weight of a toluene/ethyl acetate mixed solvent (weight ratio=2/1). In the same manner as described in Example 5, carbon steel sheets were bonded together by using the obtained solution. The bonded body was dried at room temperature for 20 hours and at 90° C. for 30 minutes, and the bonded body was heated at 180° C. for 30 minutes to effect curing. Then, the bonded body was cooled to room temperature and the physical properties were measured. The results are shown in Table 2.

As is shown in Table 2, if the silicone polymer was not used, the tensile shear strength and peel strength were lower than those obtained in Example 5.

COMPARATIVE EXAMPLE 9

A ladder silicone oligomer solution having a ladder silicone oligomer concentration of 70% by weight was prepared by dissolving a ladder silicone oligomer of the general formula (III) having a molecular weight of 2,100, in which $R_5$ was a methyl group, the hydroxyl group content was 0.6% by weight and the ethoxy group content was 0.8% by weight, in a toluene/ethyl acetate mixed solvent (weight ratio=2/1). Then, 100 parts by weight of the obtained solution was mixed with the same silicone polymer solution as prepared in Example 5 to form a composition.

In the same manner as described in Example 5, carbon steel sheets were bonded together by using the obtained composition, and the bonded body was dried and then heated at 180° C. for 30 minutes to effect curing. The physical properties were measured. The results are shown in Table 2. As is apparent from the results shown in Table 2, if the ladder silicone oligomer having too low hydroxyl group and ethoxy group contents was used, the bonded body was inferior in both of the heat resistance and solvent resistance.

COMPARATIVE EXAMPLE 10

A ladder silicone oligomer solution having an oligomer concentration of 70% by weight was prepared by dissolving a ladder silicone oligomer of the general formula (III) having a molecular weight of 2,100, in which $R_5$ was methyl group, the hydroxyl group content was 15% by weight and the ethoxy group content was 15% by weight, into a toluene/ethyl acetate mixed solvent (weight ratio=2/1). A composition was prepared by mixing this oligomer solution with the same silicone polymer solution as prepared in Example 5. Bonding and curing were carried out in the same manner as described in Example 5. The physical properties were as shown in Table 2. It was found that if the hydroxyl group and ethoxy group contents in the ladder silicone oligomers were too high, the bonded body was poor in the peel bonding strength and water resistance.

properties were measured. The obtained results are shown in Table 2.

As is apparent from the results shown in Table 2, if the silicone polymer having too low a molecular weight was used in combination with the ladder silicone oligomer, the improvement of the peel strength in the bonded body was unsatisfactory, and the solvent resistance was poor.

TABLE 2

|  | Bonding Test Results | | | | |
|---|---|---|---|---|---|
|  | Tensile shear strength (kgf/cm$^2$) | Peel strength (kgf/cm) | Heat resistance (kgf/cm$^2$) | Water resistance (kgf/cm$^2$) | Solvent resistance (kgf/cm$^2$) |
| Example 5 | 98 | 4.3 | 60 | 93 | 75 |
| Comparative Example 8 | 18 | 0 | 6 | 13 | 10 |
| Comparative Example 9 | 70 | 3.3 | 3 | 24 | 0 |
| Comparative Example 10 | 82 | 0.9 | 45 | 7 | 60 |
| Comparative Example 11 | 41 | 0.7 | 31 | 40 | 45 |
| Comparative Example 12 | 32 | 0 | 14 | 22 | 12 |

COMPARATIVE EXAMPLE 11

A silicone polymer having a molecular weight of 2,700 was prepared by condensing a compound of the general formula (I), in which $R_1$ was a methyl group and $R_2$ was an ethyl group, with a compound of the general formula (II), in which $R_3$ was a methyl group and $R_4$ was an ethyl group, at a molar ratio of 1/20. A silicone polymer solution having a silicone polymer concentration of 70% by weight was prepared by dissolving this silicone polymer in a toluene/ethyl acetate mixed solvent (weight ratio=2/1). A composition was prepared by mixing this silicone polymer solution with the same ladder silicone oligomer solution as prepared in Example 5 at a weight ratio of 1/10. Bonding and curing were carried out in the same manner as described in Example 5. The physical properties were measured. The results are shown in Table 2.

As shown in Table 2, where the silicone polymer prepared by using the compound of the general formula (II) at a molar ratio exceeding the range specified in the present invention was used, the tensile shear strength and peel strength were low and no improvement was attained.

COMPARATIVE EXAMPLE 12

A silicone polymer having a molecular weight of 380 was prepared by condensing a compound of the general formula (I), in which $R_1$ was methyl group and $R_2$ was an ethyl group, with a compound of the general formula (II), in which $R_3$ was a methyl group and $R_4$ was an ethyl group, at a molar ratio of ½. A silicone polymer solution having a silicone polymer concentration of 70% by weight was prepared by dissolving this silicone polymer in a toluene/ethyl acetate mixed solvent (weight ratio=2/1). A composition was prepared by mixing this solution with the same ladder silicone oligomer solution as prepared in Example 5 at a weight ratio of ½. Bonding and curing were carried out in the same manner as described in Example 5, and the physical

COMPARATIVE EXAMPLE 13

A silicone polymer solution was prepared by dissolving 40 parts by weight of a silicone polymer having a molecular weight of 1,000, which was obtained by condensing a compound of the general formula (I), in which $R_1$ was a methyl group and $R_2$ was an ethyl group, with a compound of the general formula (II), in which $R_3$ L was a methyl group and $R_4$ was an ethyl group, at a molar ratio of 1/0.1, into 20 parts by weight of a toluene/ethyl acetate mixed solvent (weight ratio=2/1). When this solution was added to the same ladder silicone oligomer solution as prepared in Example 5 and the mixture was stirred, it was found that the compatibility was unsatisfactory. When this mixture having an unsatisfactory compatibility was directly coated on a carbon steel sheet, coating unevenness was conspicuous, and uniform coating was impossible. Accordingly, the bonding test was not carried out.

COMPARATIVE EXAMPLE 14

A silicone polymer solution was prepared by dissolving 40 parts by weight of a silicone polymer having a molecular weight of 110,000, which was obtained by condensing a compound of the formula (I), in which $R_1$ was a methyl group and $R_2$ was an ethyl group, with a compound of the formula (II), in which $R_3$ was a methyl group and $R_4$ was an ethyl group, at a molar ratio of ½, into 20 parts by weight of a toluene/ethyl acetate mixed solvent (weight ratio=2/1). When this silicone polymer solution was added to the same ladder silicon oligomer solution as prepared in Example 1 and the mixture was stirred, it was found that the compatibility was unsatisfactory. When this mixture having an unsatisfactory compatibility was directly coated on a carbon steel sheet, coating unevenness was conspicuous, and uniform coating was impossible. Accordingly, the bonding test was not carried out.

EXAMPLE 6

A ladder silicone oligomer solution was prepared by dissolving 100 parts by weight of a ladder silicone oligomer of the general formula (III) having a molecular weight of 1,800, in which $R_5$ was a phenyl group, the hydroxyl group content was 4% by weight and the ethoxy group content was 6% by weight, in 50 parts by weight of a toluene but anol mixed solvent (weight ratio=4/1).

Separately, a silicone polymer solution was prepared by dissolving 80 parts by weight of a silicone polymer having a molecular weight of 2,100, which was obtained by condensing a compound of the general formula (I), in which $R_1$ was a phenyl group and $R_2$ was a methyl group, with a compound of the general formula (II), in which $R_3$ was a phenyl group and $R_4$ was a methyl group, at a molar ratio of ⅓, into 4 parts by weight of a toluene/acetone mixed solvent (weight ratio=4/1).

The ladder silicone oligomer solution was mixed with the silicone polymer solution, and 0.7 part by weight of finely divided silicon oxide was added to the mixture to obtain a composition. Aluminum sheets having dimensions specified in JIS K-6850 were bonded together by using the obtained composition. The bonded body was dried at room temperature for 30 minutes and at 90° C. for 15 minutes, and the bonded body was heated at 250° C. for 1 hour to effect curing. When the bonding strength test was carried out, it was found that the tensile shear strength was 77 kgf/cm², the heat resistance was 48 kgf/cm², the water resistance was 70 kgf/cm², and the solvent resistance was 43 kgf/cm².

EXAMPLE 7

A ladder silicone oligomer solution was prepared by dissolving 100 parts by weight of a ladder silicone oligomer of the general foumula (III) having a molecular weight of 2,200, in which $R_5$ comprised a methyl group and a phenyl group at a molar ratio of 2/1, the hydroxyl group content was 3% by weight and the ethoxy group content was 5% by weight, in 200 parts by weight of a toluene/butyl acetate mixed solvent (weight ratio=4/1).

Separately, a silicone polymer solution was prepared by dissolving 10 parts by weight of a silicone polymer having a molecular weight of 1,500, which was obtained by condensing a compound of the general formula (I), in which $R_1$ comprised a methyl group and a phenyl group at a milar ratio of 2/1 and $R_2$ comprised a methyl group and a phenyl group at a moler ratio of 2/1, with a compound of the general formula (II), in which $R_3$ comprised a methyl group and a phenyl group at a molar ratio of 2/1 and $R_4$ comprised a methyl group and a phenyl group at a molar ratio of 2/1, at a molar ratio of 1/5, into 20 parts by weight of a toluene butyl acetate mixed solvent (weight ratio=4/1).

A composition was prepared by mixing the ladder silicone oligomer solution with the silicone polymer solution. The compatibility between the ladder silicone oligomer solution and the silicone polymer solution was good. Glass sheet having dimensions specified in JIS K-6850, which has been treated with a silane coupling agent, was bonded to an aluminum sheet having dimensions specified in JIS K-6850, which had not been treated with a silane coupling agent, by using the obtained composition. The bonded body was dried at room temperature for 20 hours and at 90° C. for 30 minutes and was then heated at 180° C. for 30 minutes to effect curing. At the bonding test, it was found that the tensile shear strength was 52 kgf/cm², the heat resistance was 39 kgf/cm², the water resistance was 47 kgf/cm² and the solvent resistance was 33 kgf/cm².

For comparison, bonding was carried out by using the ladder silicone oligomer solution, in which the silicone polymer solution was incorporated. The bonding strength was low, and the shear strength was 11 kgf/cm², the heat resistance was 0 kgf/cm², the water resistance 7 kgf/cm² and the solvent resistance was 3 kgf/cm².

EXAMPLE 8

A ladder silicone oligomer solution was prepared by dissolving 20 parts by weight of a ladder silicone oligomer of the general formula (III) having a molecular weight of 2,800, in which $R_5$ comprised a methyl group and a phenyl group at a molar ratio of 2/1, the hydroxyl group content was 4% by weight and the ethoxy group content was 4% by weight, into 70 parts by weight of isopropanol.

A coating composition was prepared by adding 10 parts by weight of ethyl silicate 40 (the silica content was 40%) to the above solution. The compatibility between the ladder silicone oligomer and the ethyl silicate was good.

The coating composition was spray-coated on an acetone-degreased carbon steel sheet having a size of 7 cm×15 cm so that the thickness of the dry coating was 20 microns.

The coated steel sheet was dried at room temperature for 30 minutes and at 90° C. for 30 minutes, and was then heated at 200° C. for 30 minutes to effect curing.

After the curing, the coated steel sheet was immediately cooled to room temperature, and the physical properties were measured. The results are shown in Table 3.

COMPARATIVE EXAMPLE 15

A ladder silicone oligomer solution was prepared by dissolving 20 parts by weight of a ladder silicone oligomer of the general formula (III) having a molecular weight of 25,000, in which $R_5$ was a methyl group, the hydroxyl group content was 0.6% by weight and the ethoxy group content was 0.6% by weight, into 70 parts by weight of a toluene/ethyl acetate mixed solvent (weight ratio=2/1). A coating composition was prepared by adding 10 parts of ethyl silicate 40 to the ladder silicone oligomer solution.

Spray-coating and curing were carried out in the same manner as described in Example 8, and the physical properties of the cured film were measured. The results were shown in Table 3.

As is apparent from Table 3, when the ladder silicone oligomer having too low hydroxyl group and ethoxy group contents was used, the solvent resistance of the coating film was poor.

COMPARATIVE EXAMPLE 16

A coating composition was prepared in the same manner as described in Example 8 except that a ladder silicone oligomer of the general formula (III) having a molecular weight of 1,800, in which $R_5$ was a methyl group, the hydroxyl group content was 12% by weight and the ethoxy group content was 13% by weight, was used. Coating and curing were carried out in the same manner as described in Example 8. The results are shown in Table 3. It was found that if the hydroxyl group and ethoxy group contents were too high in the ladder silicone oligomer, the water resistance of the coating was unsatisfactory.

EXAMPLE 9

A ladder silicone oligomer solution was prepared by dissolving 12 parts by weight of a ladder silicone oligomer of the general formula (III) having a molecular weight of 21,000, in which $R_5$ comprised a methyl group and a phenyl group at a molar ratio of 2/1, the hydroxyl group content was 2% by weight and the ethoxy group content was 3% by weight, in 80 parts by weight of normal butanol.

A coating composition was prepared by adding 8 parts by weight of ethyl silicate 40 (the silica content was 40%) to the above solution.

A butanol solution containing 1% of aminopropyl-triethoxy-silane was thinly brush-coated on the surface of a laminate having a size of 200 mm×300 mm×10 mm, which was composed of an epoxy resin and a glass cloth, and the coated laminate was dried at 50° C. and cooled. Then, the above coating composition was spray-coated on the laminate.

The coated laminate was dried at room temperature for 30 minutes and at 80° C. for 30 minutes, and was then heated at 150° C. for 30 minutes to effect curing.

After the curing, the laminate was immediately taken out into an atmosphere maintained at room temperature and cooled. The physical properties were measured. The results are shown in Table 3.

TABLE 3

| | Crack resistance*[1] | Water resistance | Solvent resistance |
|---|---|---|---|
| Example 8 | A | No change | No change |
| Comparative Example 15 | A | Slight swelling | Dissolution |
| Comparative Example 16 | B | swelling and peeling | No change |
| Example 9 | A | No change | No change |

Note
*[1]observation was performed after heating at 200° C. for 1 hour and cooling

EXAMPLE 10

A ladder silicone oligomer solution was prepared by dissolving 15 parts by weight of a ladder silicone oligomer of the general formula (III) having a molecular weight of 2,800, in which $R_5$ was a methyl group, the hydroxyl group content was 4% by weight and the ethoxy group content was 4% by weight, in 53 parts by weight of isopropanol.

Separately, a silicone polymer solution was prepared by dissolving 5 parts by weight of a silicone polymer having a molecular weight of 12,000, which was obtained by condensing a compound of the general formula (I), in which $R_1$ was a methyl group and $R_2$ was an ethyl group, with a compound of the general formula (II), in which $R_3$ was a methyl group and $R_4$ was an ethyl group, at a molar ratio of ½, into 2 parts by weight of a toluene/ethyl acetate mixed solvent (weight ratio=2/1).

The ladder silicone oligomer solution was mixed with the silicone polymer solution, and a coating composition was prepared by adding 7 parts by weight of ethyl silicate 40 (the silica content was 40% by weight) to the mixture. The compatibility was good.

The coating composition was spray-coated on an acetone-degreased carbon steel sheet having a size of 7 cm×15 cm so that the dry coating thickness was 20 microns.

The coated steel sheet was dried at room temperature for 30 minutes and at 90° C. for 30 minutes and was then heated at 200° C. for 30 minutes to effect curing.

After the curing, the sheet was cooled to room temperature, and the physical properties were measured. The results are shown in Table 4.

EXAMPLE 11

A ladder silicone oligomer solution was prepared by dissolving 8 parts by weight of a ladder silicone oligomer of the general formula (III) having a molecular weight of 21,000, in which $R_5$ comprised a methyl group and a phenyl group at a molar ratio of 2/1, the hydroxyl group content was 2% by weight and the ethoxy group content was 3% by weight, in 60 parts by weight of normal butanol.

Separately, a silicone polymer solution was prepared by dissolving 3 parts by weight of a silicone polymer having a molecular weight of 52,000, which was obtained by condensing a compound of the general formula (I), in which $R_1$ was a methyl group and $R_2$ was an ethyl group, with a compound of the general formula (II), in which $R_3$ was a phenyl group and $R_4$ was an ethyl group, at a molar ratio of 1/1. into 20 parts by weight of a toluene ethyl acetate mixed solvent (weight ratio=2/1).

The ladder silicone oligomer solution was mixed with the silicone polymer solution, and 9 parts by weight of ethyl silicate (the silica content was 40% by weight) was added to the mixture to obtained a coating composition. The compatibility was good.

In the same manner as described in Example 10, the coating composition was spray-coated on a carbon steel sheet, and curing was carried out. The physical properties of the cured coating are shown in Table 4.

COMPARATIVE EXAMPLE 17

A coating composition was prepared in the same manner as described in Example 11 except that the ladder silicone oligomer solution was prepared by dissolving 6 parts by weight of the ladder silicone oligomer into 40 parts by weight of normal butanol and the silicone polymer solution was prepared by dissolving 5 parts by weight of the silicone polymer in 40 parts by weight of a toluene/ethyl acetate mixed solvent (weight ratio=2/1).

Coating and curing were carried out in the same manner as described in Example 10, and the obtained coating was tested. The results are shown in Table 4.

COMPARATIVE EXAMPLE 18

A silicone oligomer solution was prepared by dissolving 15 parts by weight of a ladder silicone oligomer of the general formula (III) having a number average molecular weight of 25,000, in which $R_5$ was a methyl group, the hydroxyl group content was 0.6% by weight and the ethoxy group content was 0.7% by weight, into 53 parts by weight of isopropanol. Separately, a silicone polymer solution was prepared by dissolving 5 parts by weight of the same silicone polymer as used in Example 10 in 20 parts by weight of a toluene/ethyl acetate mixed solvent (weight ratio=2/1).

The ladder silicone oligomer solution was mixed with the silicone polymer solution, and a coating composition was prepared by adding 7 parts by weight of ethyl silicate 40 to the mixture.

In the same manner as described in Example 10, spray coating and curing were carried out, and the physical properties of the cured coating film were measured. The results are shown in Table 4.

As is apparent from Table 4, if the ladder silicone oligomer having too low hydroxyl group and ethoxy group contents was used, the solvent resistance of the coating film was unsatisfactory.

COMPARATIVE EXAMPLE 19

A coating composition was prepared in the same manner as described in Example 10 except that a ladder silicone oligomer of the general formula (III) having a number average molecular weight of 1,800, in which $R_5$ was a methyl group, the hydroxyl group content was 12% by weight and the ethoxy group content was 13% by weight, was used. Coating and curing were carried out in the same manner as described in Example 10. The results are shown in Table 4. Thus, where the hydroxyl group and ethoxy group contents were too high in the ladder silicone oligomer, the water resistance of the coating was unsatisfactory.

COMPARATIVE EXAMPLE 20

A ladder silicone oligomer solution was prepared by dissolving 8 parts by weight of a ladder silicone oligomer of the general formula (III) having a number average molecular weight of 85,000, in which $R_5$ was a phenyl group, the hydroxyl group content was 2% by weight and the ethoxy group content was 2% by weight, into 66 parts by weight of normal butanol. A long time was required for complete dissolution.

Separately, a silicone polymer solution was prepared by dissolving 4 parts by weight of a silicone polymer having a molecular weight of 120,000, which was obtained by condensing a compound of the general formula (I), in which $R_1$ was a phenyl group and $R_2$ was an ethyl group, with a compound of the general formula (II), in which $R_3$ was a phenyl group and $R_4$ was an ethyl group, at a molar ratio of ½, into 16 parts by weight of a toluene/acetone mixed solvent (weight ratio=4/1). A long time was required for complete dissolution.

The ladder silicone oligomer was mixed with the silicone polymer solution, and 6 parts by weight of ethyl silicate (the silica content was 35% by weight) was added to the mixed solution to obtain a coating composition.

Coating and curing were carried out in the same manner as described in Example 10, and though it was intended to test the coating, the physical properties were not measured because the coating was extremely cracked.

COMPARATIVE EXAMPLE 21

A ladder silicone oligomer solution was prepared by dissolving 8 parts by weight of a ladder silicone oligomer of the general formula (III) having a molecular weight of 430, in which $R_5$ was a methyl group, the hydroxyl group content was 8% by weight and the ethoxy group content was 8% by weight, in 66 parts by weight of normal butanol.

Separately, a silicone polymer solution was prepared by dissolving 4 parts by weight of a silicone polymer having a molecular weight of 470, which was obtained by condensing a compound of the general formula (I), in which $R_1$ was a methyl group and $R_2$ was an ethyl group, with a compound of the general formula (II), in which $R_3$ was a methyl group and $R_4$ was an ethyl group, at a molar ratio of ½, into 16 parts by weight of a toluene/acetone mixed solvent (weight ratio=4/1).

The ladder silicone oligomer was mixed with the silicone polymer solution, and 6 parts by weight of ethyl silicate 40 (the silica content was 40 by weight) was added to the mixed solution to obtained a coating composition.

Coating and curing were carried out in the same manner as described in Example 10, and though it was intended to test the coating, the physical properited were not measured because swelling and peeling were observed in the cured coating and the intented objects of the present invention were not attained.

TABLE 4

|  | Crack resistance*[1] | Water resistance | Solvent resistance |
| --- | --- | --- | --- |
| Example 10 | A | No change | No change |
| Comparative Example 11 | A | No change | No change |
| Comparative Example 17 | A | Slight swelling | Dissolution |
| Comparative Example 18 | A | Swelling | Dissolution |
| Comparative Example 19 | B | Swelling | No change |

Note
*[1]observation was performed after heating at 200° C. for 1 hour and cooling The ladder silicone oligomer composition is valuable as a coating material for such substrates as metals, ceramics, glass and plastics and an insulating coating material for electronic materials, and also as an adhesive for bonding these substrates.

The coating prepared from the composition of the present invention has an excellent heat resistance, insulating property and crack resistance. It is to be especially noted that a high stability against cracking at the time of forming a thick coating, which cannot be attained when respective components of the present invention are used singly, can be attained in the present invention. The reason why this excellent effect is attained has not been completely elucidated, but, it can be construed that the ladder silicon oligomer used as the component [A] in the present invention contains large quantities of reactive ethoxy and hydroxyl groups and these reactive groups react well with the remaining alkoxy groups contained in the silicone polymer as the component [B] and the ethoxy groups of the ethyl silicate as the component [B] on the monomer level, and complete conjugation can be realized on the molecule level.

We claims:

1. A ladder silicone oligomer composition which comprises:
   (A) 100 parts by weight of a ladder silicone oligomer containing 1 to 10% by weight of hydroxyl groups and 1 to 10% by weight of ethoxy groups;
   (B) 1 to 200 parts by weight of at least one silicone-containing compound selected from the group consisting of:
      (a) silicone oligomers or polymers having a number average molecular of 500 to 100,000 which are obtained by reacting a compound represented by the following general formula (I):

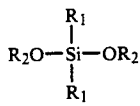

wherein $R_1$ represents an alkyl group having 1 to 5 carbon atoms, or a phenyl group, and $R_2$ represents an alkyl group having 1 to 5 carbon atoms, with a compound represented by the following general formula (III):

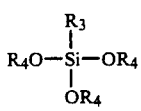

wherein $R_3$ represents an alkyl group having 1 to 5 carbon atoms, or a phenyl group, and $R_4$ represents an alkyl group having 1 to 5 carbon atoms. the molar ratio of the compound (I) to the compound (II) being from 1/0.3 to 19, and (b) an ethyl silicate having a silica content of 28.8 to 45% by weight and hydrolysis products thereof; and (c) an organic solvent.

2. A ladder silicone composition as set forth in claim 1 wherein the ladder silicone oligomer has a repeating unit structure having general formula (III):

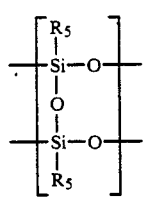

wherein $R_5$ represents an alkyl group having 1 to b 5 carbon atoms, a phenyl group, a hydroxyl group or a mixture thereof, and said ladder silicone oligomer having terminal groups which are ethoxy or hydroxyl groups.

3. A ladder silicone oligomer composition as set forth in claim 2, wherein the number average molecular weight of the ladder silicone oligomer (A) is 300 to 50,000.

4. A ladder silicone oligomer composition as set forth in claim 1, wherein the number average molecular weight of the ladder silicone oligomer (A) is 300 to 50,000.

5. A ladder silicone oligomer composition as set forth in claim 2, wherein $R_5$ in the general formula (III), $R_1$ in the general formula (I) and $R_3$ in the general formula (II) are the same groups.

6. A ladder silicone oligomer composition as set forth in claim 1, wherein the ethyl silicate (B) contains 38 to 41% by weight of silica.

7. A ladder silicone oligomer composition as set forth in claim 1, wherein the ethyl silicate (B) is represented by the following formula (V):

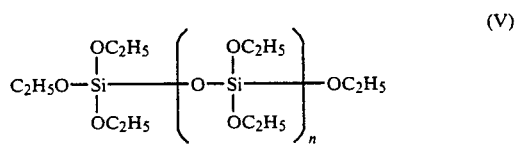

wherein n is 0 or a positive integer.

8. A ladder silicone oligomer composition as set forth in claim 1, comprising a coating composition comprising 100 parts by weight of the ladder silicone oligomer (A) and 1 to 50 parts by weight of the silicone polymers or oligomers (B).

9. A ladder silicone oligomer composition as set forth is claim 1, comprising an adhesive composition comprising 100 parts by weight of the ladder silicone oligomer (A) and 1 to 50 parts by weight of the silicone polymers or oligomers (B).

10. A ladder silicone oligomer composition as set forth in claim 1, comprising a coating composition comprising 100 parts by weight of the ladder silicone oligomer (A) and 5 to 100 parts by weight of the ethyl silicate (B).

11. A ladder silicone oligomer composition as set forth in claim 1, comprising a coating composition comprising 100 parts by weight of the ladder silicone oligomer (A), 1 to 50 parts by weight of the silicone polymers or oligomers (B), and 5 to 100 parts by weight, per 100 parts by weight of the sum of the ladder silicone oligomer (A) and the silicone polymers or oligomers (B), of the ethyl silicate (B).

12. A ladder silicone oligomer composition as set forth in claim 1, wherein the organic solvent (C) is selected from the group consisting of alcohols, esters, ketones, aromatic hydrocarbons, and the total concentration of the components (A) and (B) in the composition is 5 to 70% by weight.

* * * * *